United States Patent [19]

Mori et al.

[11] Patent Number: 4,894,746
[45] Date of Patent: Jan. 16, 1990

[54] LAMINATED CAPACITOR WITH FUSE FUNCTION

[75] Inventors: Susumu Mori; Katuhiko Maruta, both of Kyoto, Japan

[73] Assignee: Murata Manufacturing Co., Ltd., Japan

[21] Appl. No.: 201,609

[22] Filed: Jun. 2, 1988

[30] Foreign Application Priority Data

Jun. 6, 1987 [JP] Japan ............................ 62-141922
Jun. 6, 1987 [JP] Japan ............................ 62-141923

[51] Int. Cl.$^4$ ........................ H01G 1/11; H01G 4/10
[52] U.S. Cl. .................................. 361/275; 361/321
[58] Field of Search ............... 361/272, 275, 306, 328, 361/330, 321, 433

[56] References Cited

U.S. PATENT DOCUMENTS

| | | | |
|---|---|---|---|
| 3,236,976 | 2/1966 | Rayno ............................ | 361/275 X |
| 4,193,106 | 3/1980 | Coleman ......................... | 361/275 |
| 4,617,609 | 10/1986 | Utner et al. .................... | 361/321 C X |
| 4,680,670 | 7/1987 | Chan ............................. | 361/275 |
| 4,720,767 | 1/1988 | Chan et al. ..................... | 361/275 |

FOREIGN PATENT DOCUMENTS 1324010 7/1973 United Kingdom ............... 361/275

OTHER PUBLICATIONS

I.B.M. Technical Disclosure Bulletin, vol. 25, No. 8, Jan. 1983, p. 4081.

Primary Examiner—Donald A. Griffin
Attorney, Agent, or Firm—Ostrolenk, Faber, Gerb & Soffen

[57] ABSTRACT

A plurality of internal electrodes (17, 18) are formed in a laminated state with a respective dielectric layer (12b, 12c) held between each pair of adjacent internal electrodes to give capacitance. A pair of external electrodes (15, 16) are electrically connected to associated internal electrodes in order to connect the capacitance to external circuits. Each internal electrode comprises a capacitance forming portion (19, 22) a take-out (external connection) portion (20, 23) connected to the associated external electrode, and a fuse portion (21, 24) which electrically interconnects the capacitance forming portion and take-out portion. The fuse portion is melted earlier than the capacitance forming portion and take-out portion by the Joule heat produced when a current higher than a predetermined value flows through the fuse portion.

5 Claims, 3 Drawing Sheets

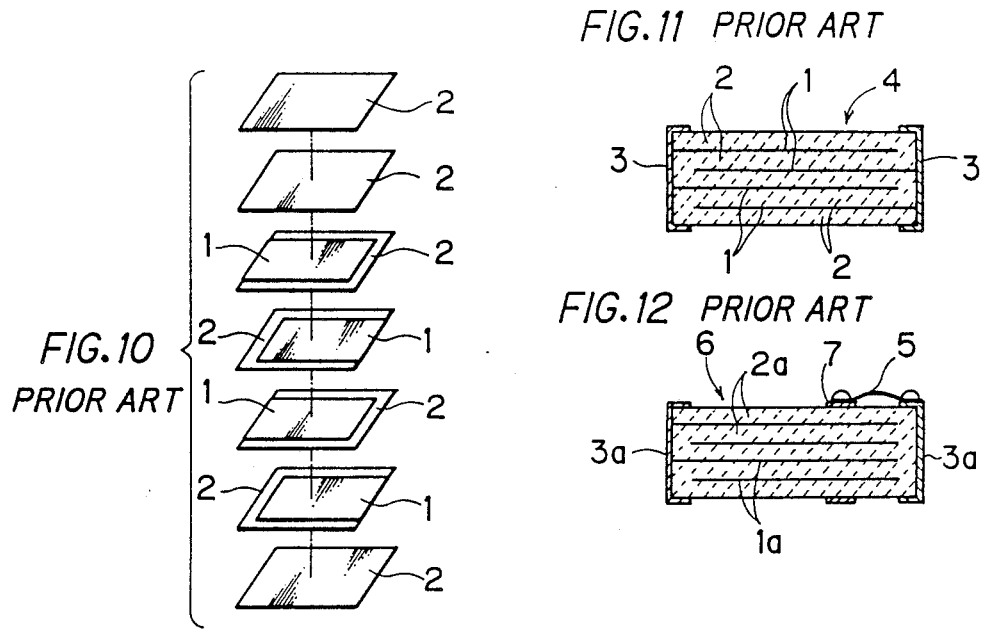

LAMINATED CAPACITOR WITH FUSE FUNCTION

BACKGROUND OF THE INVENTION

1. Field of the Invention

This invention relates to a laminated capacitor and particularly to improvements in an arrangement for providing a laminated capacitor with a fuse function.

2. Description of the Prior Art

A conventional typical laminated capacitor construction is shown in FIGS. 10 and 11. This laminated capacitor 4 comprises a plurality of internal electrodes 1 formed in a laminated state, with dielectric layers 2 held each between adjacent internal electrodes 1 to give capacitance. A first set of internal electrodes 1 are formed to extend to one of the respective end edges of the dielectric layers 2, while a second set of internal electrodes 1 are formed to extend to the other end edges of the dielectric layers 2. Such internal electrodes 1 are arranged so that the first and second sets of internal electrodes alternate with each other. Opposed end surfaces of the dielectric laminated structure comprising laminated dielectric layers 2 are formed with external electrodes 3. One of these external electrodes 3 is electrically connected to the first set of internal electrodes 1, and similarly the other is electrically connected to the second set of internal electrodes 1.

In the laminated capacitor 4, if one dielectric layer 2 has defects, such as formation of voids, a short often forms between internal electrodes 1 which are positioned on the opposite surfaces of said particular dielectric layer 2. If such short occurs, the capacitor 4 immediately stops functioning as such, resulting in the problem of adversely affecting the entire device using such capacitor 4.

To solve this problem, there is proposed a laminated capacitor 6, as shown in FIG. 12, wherein to maintain the open mode in the circuit using this capacitor 4 even if the capacitor 4 is broken down as described above, a fuse 5 is attached to the outside (U.S. Pat. No. 4,193,106).

However, the laminated capacitor 6 shown in FIG. 12 requires not only the labor of attaching a fuse 5 separately but also the labor of connecting said fuse 5 between one external electrode 3a and associated ones of internal electrodes 1a. To this end, it is necessary to form an intermediate electrode 7, besides a pair of external electrodes 3a, on an outer surface of the dielectric laminated structure. As for particular ones of internal electrodes 1a to be formed on the dielectric layers 2a, it is necessary to change their patterns so that they are electrically connected to the intermediate electrode 7. Such labor and change in design involve an increase in the cost of the capacitor 6. Further, if a breakdown as described above takes place in the capacitor 6 and the fuse 5 blows, this capacitor 6 no longer functions as such. Further, since the capacitor 6 has the intermediate electrode 7 formed thereon, limitations in the direction of the capacitor 6 are sometimes encountered when the capacitor 6 is to be mounted on a printed circuit board. Since the fuse 5 is connected in series to the capacitance provided by the capacitor 6, there is a problem that an equivalent series resistance which appears between the pair of external electrode 3 of the capacitor 6 increases undesirably.

SUMMARY OF THE INVENTION

Accordingly, this invention is intended to provide laminated capacitor which has a fuse function which is obtained without having to attach any separate element which provides such fuse function.

A laminated capacitor according to this invention comprises a dielectric laminated structure including a plurality of laminated dielectric layers and having first and second end surfaces. The dielectric laminated structure is internally formed with first and second sets of internal electrodes in such a manner that the first set of internal electrodes are each positioned between particular adjacent dielectric layers and each comprising a first capacitance forming portion and a first take-out (i.e., external connection) portion electrically connected to said first capacitance forming portion and extending to a first end surface of the dielectric laminated structure. The second set of internal electrodes are positioned on particular interfaces of dielectric layers with particular dielectric layers held between the second set of internal electrodes and their adjacent ones of the first set of internal electrodes, and each of them comprises a second capacitance forming portion opposed to the first capacitance forming portion of each the first set of internal electrodes, and a second take-out portion electrically connected to said second capacitance forming portion and extending to a second end surface of the dielectric laminated structure. First and second external electrodes are formed on the first and second end surfaces of the dielectric laminated structure, whereby the first external electrode is electrically connected to the first take-out portions of the first set of internal electrodes, and the second external electrode is electrically connected to the second take-out portions of the second set of internal electrodes.

It is to be noted that the laminated capacitor of such construction has the following arrangement: Each of at least one of the first and second sets of internal electrodes comprises a fuse portion which electrically interconnects the capacitance forming portion and the take-out portion. The fuse portion is melted earlier than the capacitor forming portion and take-out portion by the Joule heat produced when a current higher than a predetermined value flows through the fuse portion.

According to the invention, when the presence of a defect in a certain dielectric layer results in a short between internal electrodes positioned on opposite sides of said dielectric layer, a large current flows therethrough, whereupon a fuse portion which forms a portion of the path of current formed by said internal electrodes is blown by Joule heat. Therefore, the shorted internal electrodes and the dielectric layer between them lose the capacitor function. However, the other internal electrodes and dielectric layers held therebetween are still able to function as capacitors.

Further, this invention, unlike the laminated capacitor shown in FIG. 12, requires no labor of attaching a separately prepared fuse 5 to the exterior or newly forming an intermediate electrode 7 to which such fuse 5 is to be attached. Further, according to the laminated capacitor of the invention, since the directivity in mounting it on a printed circuit board or the like can be eliminated, it is no longer necessary to pay attention to the directivity during mounting. Further, the laminated capacitor does not lead to so serious an increase in the equivalent series resistance.

In a preferred embodiment of the invention, to ensure that the fuse portion is melted earlier than the capacitance forming portion and take-out portion by a current higher than a predetermined value, the fuse portion is given a higher electrical resistance than those of the capacitance forming portion and take-out portion. Typically, there are the following two manners as means for giving the fuse portion a higher electric resistance: A first manner is to form the fuse portion of a material having a higher specific resistance than those of the capacitance forming portion and take-out portion, and a second manner is to form the fuse portion so that it has a smaller cross-sectional area in the direction of flow of current than those of the capacitance forming portion and take-out portion.

These objects and other objects, features, aspects and advantages of the present invention will become more apparent from the following detailed description of embodiments of the present invention when taken in conjunction with the accompanying drawings.

BRIEF DESCRIPTION OF THE DRAWINGS

FIG. 10 is an exploded perspective view showing a plurality of dielectric layers included in a conventional laminated type ceramic capacitor;

FIG. 11 is a sectional view of a capacitor formed of the dielectric layers shown in FIG. 10; and FIG. 12 is a view of a conventional laminated type ceramic capacitor which includes a fuse.

DESCRIPTION OF THE PREFERRED EMBODIMENTS

Figure 1:
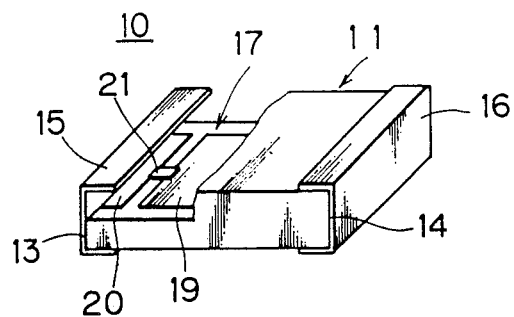
FIG. 1 is a perspective view, partly cut away, of a laminated ceramic capacitor according to an embodiment of the invention.
Figure 4:
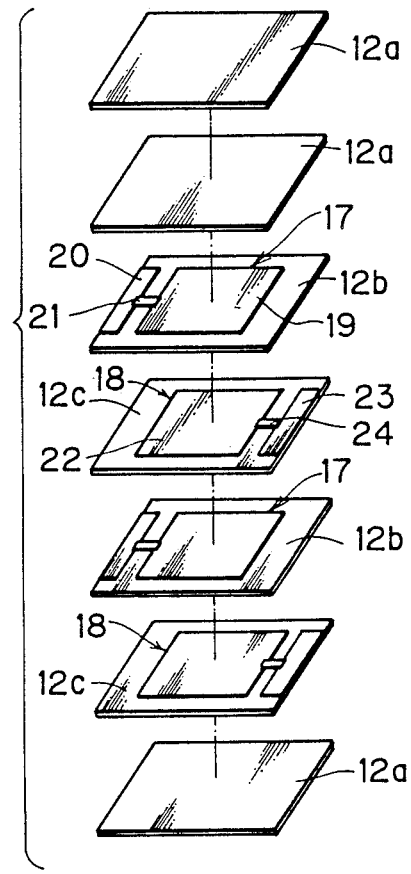
FIG. 4 is an exploded perspective view showing the dielectric laminated structure included in the capacitor shown in FIG. 1.

Referring to FIG. 1, a laminated type ceramic capacitor 10 comprises a dielectric laminated structure 11. The dielectric laminated structure 11, as shown in FIG. 4, includes a plurality of laminated dielectric layers 12a, 12b, and 12c. The laminated structure 11 has first and second end surfaces 13 and 14. These first and second end surfaces 13 and 14 are formed with first and second external electrodes 15 and 16, respectively.

The dielectric layers 12b are formed with a first set of internal electrodes 17, and the dielectric layers 12c are formed with a second set of internal electrodes 18. Each of the first internal electrodes 17 comprises a first capacitance forming portion 19, a first take-out (external connection) portion 20 extending to the first end surface 13, and a first fuse portion 21 which electrically interconnects said capacitance forming portion 19 and said take-out portion 20. On the other hand, each of the second set of internal electrodes 18 comprises a second capacitance forming portion 22, a second take-out portion 23 extending to the second end surface 14, and a second fuse portion 24 which electrically interconnects said capacitance forming portion 22 and said take-out portion 23. These dielectric layers 12b and 12c, as shown in. FIG. 4, are alternately laminated to each other. In the laminated state, the first and second capacitance forming portions 19 and 22 are opposed to each other with the dielectric layer 12b or 12c disposed therebetween, whereby a capacitance. is imparted between these capacitance forming portions 19 and 22. Further, when the first and second external electrodes 15 and 16 are formed as shown in FIG. 1, they are electrically connected to the first and second take-out portions 20 and 23, respectively.

Though not shown in FIG. 1, lead terminals may be connected to external terminals 15 and 16 and the entire capacitor 10 may then be covered with electrically insulating resin so that these lead terminals are exposed, as required.

The laminated type ceramic capacitor 10 is manufactured as follows.

Figure 2:
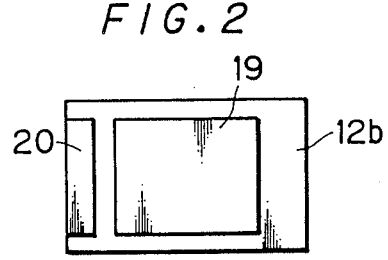
FIG. 2 is a plan view showing a particular dielectric layer included in the capacitor shown in FIG. 1, the dielectric layer having a capacitance forming portion and a take-out portion.

The dielectric layers 12a, 12b and 12c are prepared by using ceramic green sheets which are 15 to 60 μm thick. Of these green sheets, the green sheets which are to become the dielectric layers 12b and 12c have electrically conductive films printed on one of their respective main surfaces as by the screen printing method using a metal paste containing a material of relatively low specific resistance. Said electrically conductive films being to become first and second capacitor forming portions 19 and 22 and first and second take-out portions 20 and 23. After said printing, they are dried. The main material which forms the metal paste used here is, for example, palladium, palladium-silver alloy, platinum, nickel, copper or the like. As shown in FIG. 2 with regard to one dielectric layer 12b initially, each dielectric layer 12b has formed thereon a capacitance forming portion 19 and a take-out portion 20 spaced from each other.

Figure 3:
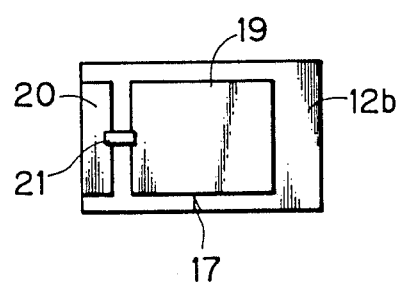
FIG. 3 is a plan view showing the dielectric layer shown in FIG. 2, illustrating the capacitance forming portion and take-out portion being interconnected by a fuse portion.

As shown in FIG. 3 showing the dielectric layer 12b, a fuse portion 21 is then formed so that the capacitance forming portion 19 and the take-out portion 20 are electrically connected. The fuse portion 21 is formed by printing on the dielectric layer 12b a metal paste containing a metal material having a higher specific resistance than those of the capacitance forming portion 19 and take-out portion 20 or applying said metal paste to the dielectric layer 12b, and then drying the same. The metal material contained in the metal paste for the fuse portion 21 is, for example, nickel-chromium alloy, zinc, aluminum or the like. The geometrical configurations (length, width and thickness) of the fuse portion 21 and the kind of the metal material used therefor are determined so that the Joule heat produced therein by a current flowing therethrough during shorting melts the fuse portion 21.

The materials and methods used for the capacitance forming portion 22, take-out portion 23 and fuse portion 24 formed on the dielectric layer 12c are substantially the same as those used for the capacitance forming portion 19, take-out portion 20 and fuse portion 21 formed on the dielectric layer 12b described above.

Subsequently, the dielectric layers 12b and 12c are stacked alternately, as shown in FIG. 4. At this time, the first and second take-out portions 20 and 23 are positioned on opposite sides. The number of dielectric layers 12b and 12c is selected according to the value of the capacitance to be obtained.

A suitable number of dielectric layers 12a which are not formed with internal electrodes are stacked in such a manner as to hold the stacked dielectric layers 12b and 12c therebetween. Thereafter, the d electric layers 12a, 12b and 12c thus stacked are pressed in the stacking direction into a single block. When this block is fired, the dielectric laminated structure 11 shown in FIG. 1 is obtained. Subsequently, a metal paste which is to become the first and second external electrodes 15 and 16 is applied to the first and second end surfaces 13 and 14 of the dielectric laminated structure 11 as by thick-film printing method and is then dried and fired. In this manner, the laminated ceramic capacitor 10 shown in FIG. 1 is obtained As can be seen from the method of producing the capacitor 10 described above, the respective metal materials forming the capacitance forming portions 19 and 22, take-out portions 20 and 23, and fuse portions 21 and 24 must be selected so that they have melting points higher than the firing temperature of the ceramic material forming the dielectric layers 12a, 12b and 12c and so that they do not react with the ceramic material during firing.

The metal material forming the capacitance forming portions 19 and 22 and take-out portions 20 and 23 are desirably alloyable with the metal material forming the fuse portions 21 and 24. Such alloying, however, is not absolutely necessary for the following reason: The capacitance forming portions 19 and 22 and take-out portions 20 and 23 are in surface contact with the fuse portions 21 and 24 and such surface contact is made firmer by the press step performed prior to the firing step which provides the dielectric laminated structure 11. Further, in the firing step, since the capacitance forming portions 19 and 22, take-out portions 20 and 23 and fuse portions 21 and 24 are simultaneously fired, there is no danger of forming an incomplete connection therebetween.

As for an example of the materials for the internal electrodes 17 and 18, mention may be made of nickel having a specific resistance of $10^{-6}\Omega.cm$ for the capacitance forming portions 19 and 22 and take-out portions 20 and 23, and nickel-chromium alloy having a specific resistance of $10^{-4}\Omega.cm$ for the fuse portions 21 and 24.

Figure 5:
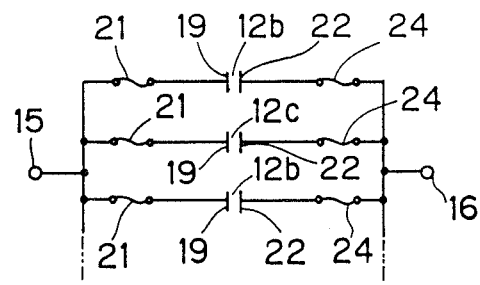
FIG. 5 is an electric equivalent circuit diagram of the laminated ceramic capacitor shown in FIG. 1.

The laminated ceramic capacitor 10 obtained in the manner described above can be represented by an equivalent electric circuit shown in FIG. 5. In FIG. 5, if a dielectric layer 12b or 12c sandwiched between the first and second capacitance forming portions 19 and 22 inherently has a defect due to the presence of voids or the like or has been deteriorated with the lapse of time and if a short takes place between the first and second capacitance forming portions 19 and 22 to cause a large current to flow therethrough, the fuse portion 21 or 24 is melted by Joule heat. Thus, the unit capacitor formed by the damaged dielectric layer is electrically cut off from the other, normal unit capacitors and ceases to function as a capacitor. However, the other, normal capacitors retain the capacitor function. Therefore, there is no possibility of the laminated ceramic capacitor 10 shorting out in its entirety. Thus, although the capacitance of the laminated ceramic capacitor 10 decreases, the capacitor 10, when considered as a whole, retains its function. Further, the presence of the fuse portions 21 and 24 dose not give rise to a serious increase in the equivalent series resistance of the capacitor 10. Rather, it is also possible for the fuse portions 21 and 24 to have the function of adjusting the equivalent series resistance of the capacitor 10.

Figure 6:
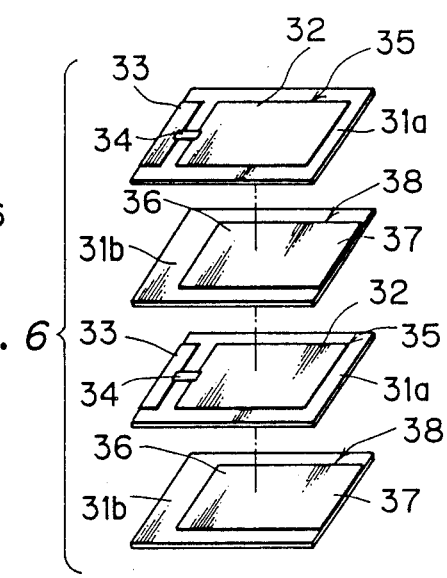
FIG. 6 is a perspective view showing a plurality of dielectric layers included in a laminated ceramic capacitor according to another embodiment of the invention.

FIG. 6 shows another embodiment of the invention. In this embodiment, dielectric layers 31a and 31b are alternately laminated, each of the dielectric layers 31a is formed with a internal electrode 35 comprising a capacitance forming portion 32, a take-out portion 33 and a fuse portion 37 in substantially the same manner as in the dielectric layer 12b described above. On the other hand, each dielectric layer 31b has an internal electrode 38 in the form in which the capacitance forming portion 36 and take-out portion 37 are integrated as a unit. That is, it has no fuse portion.

Figure 7:
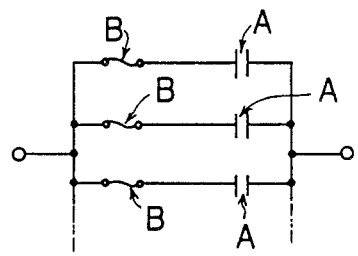
FIG. 7 is an electric equivalent circuit diagram of the capacitor according to the embodiment shown in FIG. 6.

The dielectric layers 31a and 31b shown in FIG. 6 are used to form a laminated ceramic capacitor in the same manner as in the preceding embodiment, the resulting capacitor having an equivalent electric circuit as shown in FIG. 7. That is, it is a parallel combination of series circuits each having a unit capacitor A and a fuse B.

Additional embodiments will now be described. In each of the embodiments described above, the fuse portions has been made of a material having a higher specific resistance than the respective specific resistances of the capacitance forming portion and take-out portion in order to ensure that the fuse portion has a higher electric resistance than those of the capacitance forming portion and take-out portion. In addition, in the illustrated embodiments, the fuse portion has a cross-sectional area smaller than those of the capacitance forming portion and take-out portion as viewed in the direction of flow of current, which provided an additional increase in electric resistance, but this is merely an ancillary measure. There are other ways to construct the fuse portion so that it has a higher electric resistance than the capacitance forming portion and take-out portion. For example, it is possible to construct the fuse portion so that it has a smaller cross section than the capacitance forming portion and take-out portion as viewed in the direction of flow of current even if the capacitance forming portion, take-out portion are made and fuse portion of materials having substantially the same specific resistance. This will now be described in more detail with reference to FIGS. 8 and 9.

Figure 8:
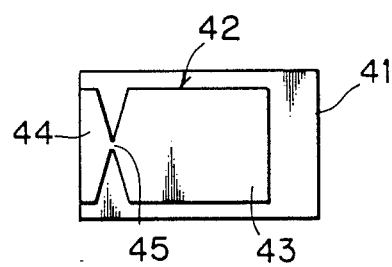
FIG. 8 is a plan view showing a dielectric layer included in still another embodiment of the invention, illustrating patterns for forming a capacitance forming portion, a take-out portion and a fuse portion which serve as an internal electrode.
Figure 9:
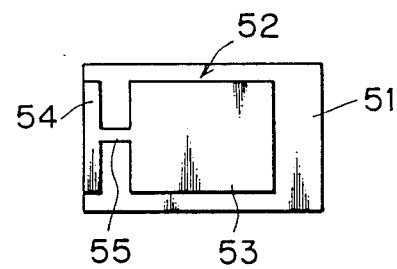
FIG. 9 is a plan view showing a dielectric layer included in still another embodiment of the invention, illustrating patterns for forming a capacitance forming portion, a take-out portion and a fuse portion which serve as an internal electrode.

In FIGS. 8 and 9 for explaining still another embodiment of the invention, dielectric layers 41 and 51 are shown in plan views, respectively. The dielectric layer 41 or 51 can be used in place of the dielectric layer 12b and/or 12c shown in FIG. 4 described above or in place of the dielectric layer 31a shown in FIG. 6.

The dielectric layer 41 shown in FIG. 8 has an internal electrode 42 formed on one main surface thereof. The internal electrode 42 comprises a capacitance forming portion 43, a take-out portion 44 extending to an end edge of the dielectric layer 41 and a fuse portion 45 which electrically interconnects the capacitance forming portion 42 and take-out portion 44. The fuse portion 45 is provided by a narrow region defined as a result of cutting wedge-shaped regions away from opposite lateral edges of the internal electrode 42. The size of the fuse portion 45 is determined by considering the kind of the metal material used for the internal electrode 42 to ensure that the fuse portion 45 is melted by the Joule heat produced when the current flowing through the capacitance forming portion 43 exceeds an allowable limit.

The capacitance forming portion 43, take-out portion 44 and fuse portion 45 are made of materials having substantially the same specific resistance. In this embodiment, the internal electrodes 42 are formed by screen-printing a metal paste. As for the metal material which is the main material forming the metal paste, such a material is selected as is not dispersed in the dielectric layer 41 during the firing of the ceramic material which forms the dielectric layer 41 and as has a relatively high specific resistance. For example, nickel-chromium alloy, zinc, aluminum and the like are used as such metal materials.

One main surface of the dielectric layer 51 shown in FIG. 9 has an internal electrodes 52 formed thereon. The internal electrode 52 comprises a capacitance forming portion 53, a take-out portion 54 and a fuse portion 55.

The internal electrode 52 shown in FIG. 9 differs only in plan view from the internal electrode 42 shown in FIG. 8. Attention paid to the fuse portion 55 shows that it is in the form of a straight strip of uniform width.

As for the shape of the fuse portion, it is not limited to a rectangle, such as the fuse portions 21 and 24 shown in FIG. 4 and the fuse portion 55 shown in FIG. 9 or to a shape defined between two opposed wedges, such as the fuse portion 45 shown in FIG. 8. For example, the fuse portion may be changed to a curvilinear form. Further, the fuse portion has only to electrically interconnect the capacitance forming portion and take-out portion; the position where the fuse portion is provided is not limited to the middle of the width of the internal electrode.

Although embodiments of the present invention have been described and illustrated in detail, it is clearly understood that the same is by way of illustration and example only and is not to be taken by way of limitation, the scope of the present invention being limited only by the terms of the appended claims.

What is claimed is:

1. A laminated capacitor comprising:
    a dielectric laminated structure including a plurality of dielectric layers and having first and second end surfaces;
    a first set of internal electrodes each positioned at an interface between a respective pair of adjacent dielectric layers and each comprising a first capacitance forming portion and a first external connection portion electrically connected to said first capacitance forming portion and extending to said first end surface;
    a second set of internal electrodes each positioned at respective interfaces between adjacent pairs of dielectric layers, such that each of said dielectric layers is held between one of said second set of internal electrodes and an adjacent one of said first set of internal electrodes, and each of said second set of internal electrodes comprising a second capacitance forming portion opposed to said first capacitance forming portion and a second external connection portion electrically connected to said second capacitance forming portion and extending to said second end surface;
    first and second external electrodes formed on said first and second end surfaces, respectively, and electrically connected respectively to the first and second external connection portion;
    each electrode of each of said first and said second sets of internal electrodes comprising a fuse portion which electrically interconnects said capacitance forming portion and said external connection portion, said fuse portion being adapted to be melted earlier than said capacitor forming portion and said external connection portion by the Joule heat produced when a current higher than a predetermined value flows through the fused portion; and
    said fuse portion, said capacitance forming portion and said external connection portion are all positioned between said adjacent pair of dielectric layers.

2. A laminated capacitor as set forth in claim 1, wherein said fuse portion has a higher electric resistance than external connecting said capacitance forming portion and portion which it interconnects.

3. A laminated capacitor as set forth in claim 2, wherein said fuse portion is made of a material having a higher specific resistance than said capacitance forming portion and said external connection portion.

4. A laminated capacitor as set forth in claim 2, wherein said capacitance forming portion, said external connection portion and said fuse portion are made of materials having substantially the same specific resistance, and said fuse portion has a smaller cross-sectional area as viewed in the direction of flow of current than said capacitance forming portion and said external connection portion.

5. A laminated capacitor as set forth in claim 1, wherein
    each electrode of said second set of internal electrodes comprises a fuse portion which electrically interconnects said capacitance forming portion and said external connection portion, said last mentioned fuse portion being adapted to be melted earlier than said capacitor forming portion and said external connection portion by the Joule heat produced when a current higher than a predetermined value flows through the fuse portion; and
    said last mentioned fuse portion, said capacitance forming portion and said external connection portion are all positioned between said adjacent pair of dielectric layers.

* * * * *